United States Patent [19]
Erickson

[11] 4,083,289
[45] Apr. 11, 1978

[54] PLASTIC FASTENER

[75] Inventor: Lloyd A. Erickson, Park Ridge, Ill.

[73] Assignee: Illinois Tool Works Inc., Chicago, Ill.

[21] Appl. No.: 768,674

[22] Filed: Feb. 14, 1977

[51] Int. Cl.² ............................................. B16B 13/08
[52] U.S. Cl. ........................................ 85/72; 85/77; 85/84
[58] Field of Search ............... 85/72, 66, 73, 74, 75, 85/76, 77, 78, 80, 81, 82, 83, 84; 24/73 P, 73 PF, 73 PM

[56] References Cited

U.S. PATENT DOCUMENTS

| 694,345 | 3/1902 | Bennett | 85/75 |
|---|---|---|---|
| 1,751,818 | 3/1930 | Karitzky | 85/84 |
| 1,855,329 | 4/1932 | Wagner | 85/74 |
| 3,105,407 | 10/1963 | Rapata | 85/72 |
| 3,385,157 | 5/1968 | Rapata | 85/72 |
| 3,385,158 | 5/1968 | Morin | 85/84 |
| 3,417,438 | 12/1968 | Schuplin | 85/72 |
| 3,678,798 | 7/1972 | Van Niel | 85/81 |
| 3,933,076 | 1/1976 | Tanaka | 85/83 |

FOREIGN PATENT DOCUMENTS

| 710,238 | 9/1941 | Germany | 85/84 |
|---|---|---|---|
| 7768/69 | 1969 | Japan | 85/72 |
| 1,122,512 | 8/1968 | United Kingdom | 85/72 |
| 1,247,193 | 9/1971 | United Kingdom | 85/84 |

Primary Examiner—Marion Parsons, Jr.
Attorney, Agent, or Firm—Jack R. Halvorsen; Robert W. Beart

[57] ABSTRACT

A plastic fastener, for example, a one-piece plastic rivet, having a head and a bifurcated oval shank and expander means capable of axial movement within a tapered bore traversing the head and shank. Each portion of the shank has a longitudinally disposed radial relief means that provides a buckle or hinge section having generally uniform radial thickness which opens into the tapered bore to provide pairs of edges falling on the frusto-conical surface of the bore which, when the edges are contacted by the expander means, will cause the shank portions to be moved radially and to be expanded circumferentially as well.

12 Claims, 16 Drawing Figures

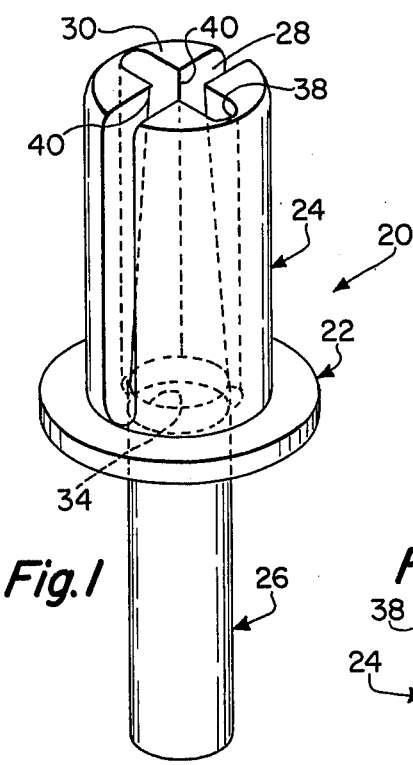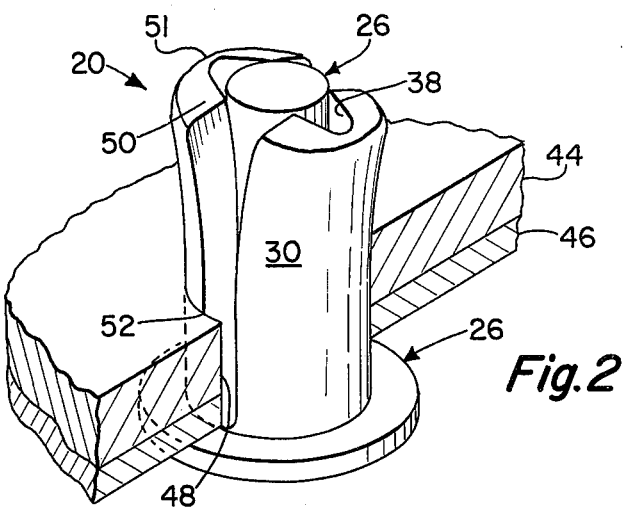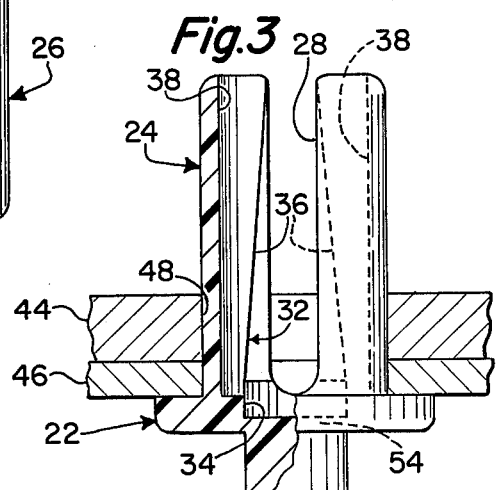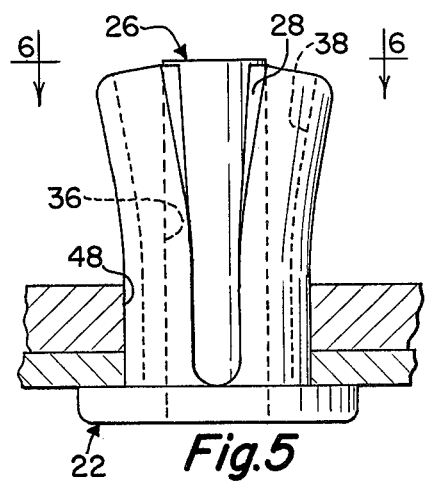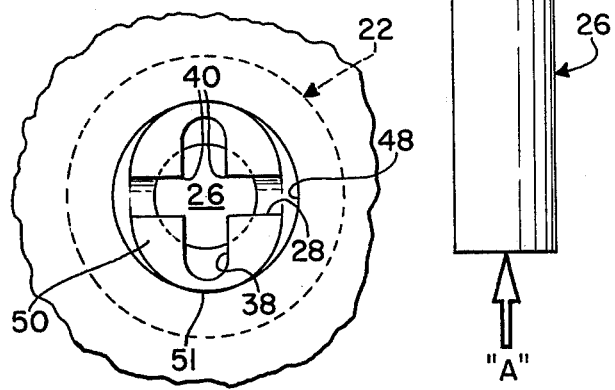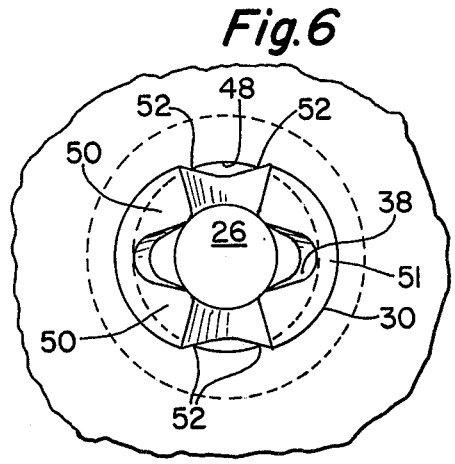

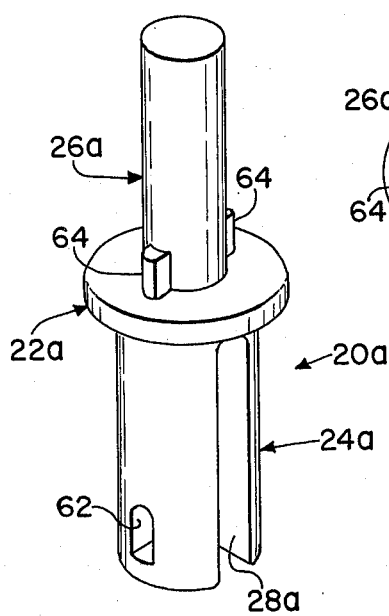
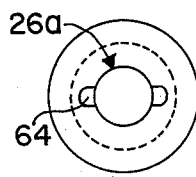
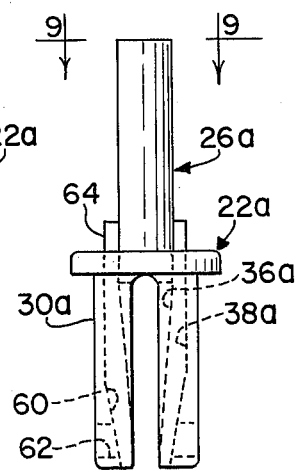
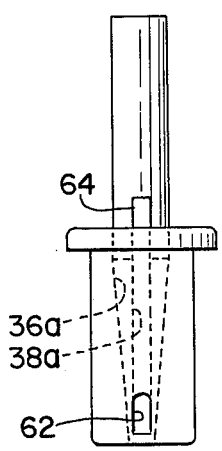
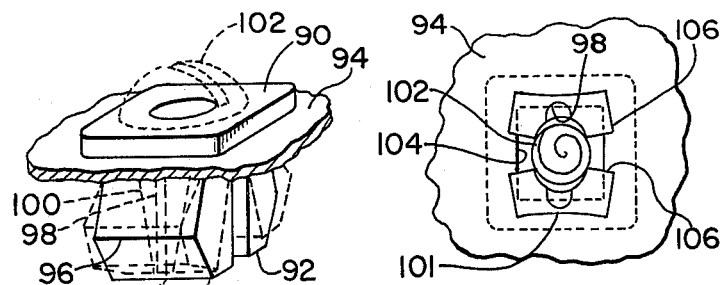
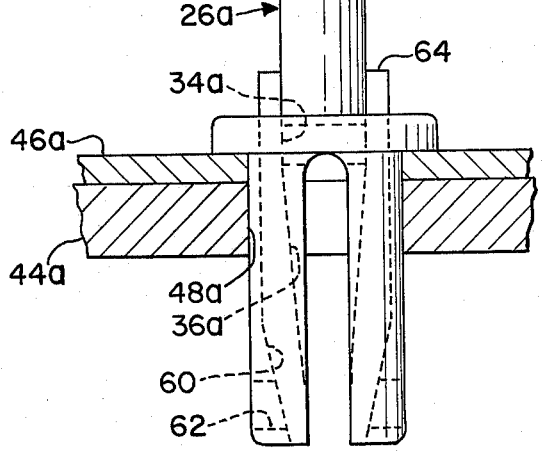
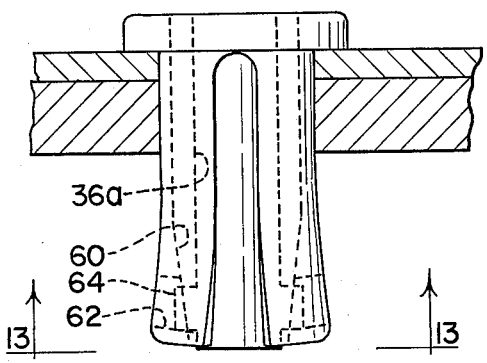
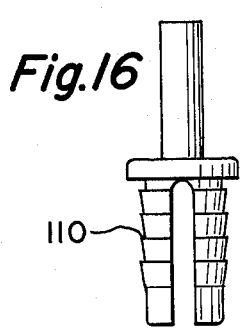

PLASTIC FASTENER

BACKGROUND OF THE INVENTION

This invention relates to a fastener, preferably a one-piece plastic fastener such as a rivet or screw grommet. It is well known in the art to provide a hollow fastener having a tapered internal bore passing through the head and shank for accepting an expander element. Such devices are found in the U.S. Pat. Nos. 2,898,798 to Carno; Rapata 3,385,157 and Birmingham 3,411,397. Each of these devices disclose a tapered internal bore in which the shank portions or prongs are merely radially expanded by a drive pin or screw, either separate or integrally molded, which when axially moved engages the tapered wall of the bore and radially expands the free ends of the shank portions or prongs outwardly beyond the surface of the apertured panel opposite the surface engaged by its head or against the side wall of a blind bore.

SUMMARY OF THE INVENTION

The present invention relates to a one-piece plastic fastener, preferably in the form of a plastic rivet or grommet, in which the shank is bifurcated and includes two or more shank portions or prongs which have a longitudinally disposed radial relief means generally in the form of a secondary slot radially disposed and communicating at least partially with a frusto-conically tapered bore to form a thinned buckle or hinge section. A suitable expander, i.e. a drive pin or screw, when driven axially, will expand the free end of the prongs or shank portions not only radially but circumferentially as well by movement of each prong about said buckle or hinge section.

Therefore, it is an object of the present invention to provide an economical, easily fabricated, one-piece plastic fastener having a bifurcated shank and an expander means, either integral or separate.

Other objects will be apparent to those skilled in the art when the specification is read in conjunction with the attached drawings.

BRIEF DESCRIPTION OF THE DRAWINGS

FIG. 1 is a perspective view of one embodiment of the present invention;

FIG. 2 is a perspective view in partial section of said embodiment of the invention in installed position securing a pair of panels;

FIG. 3 is an elevational view in partial section of the same embodiment of the invention shown in FIGS. 1 and 2 prior to axial movement of the drive pin;

FIG. 4 is an end view, rotated 90°, of the device shown in FIG. 3;

FIG. 5 is an elevational view in partial section showing the embodiment of FIG. 3 with the pin in driven position;

FIG. 6 is an end view of FIG. 5 taken along lines 6—6;

FIG. 7 is a perspective view of a second embodiment of the present invention;

FIG. 8 is an elevational view of the device shown in FIG. 7;

FIG. 9 is a top end view taken along line 9—9 in FIG. 8;

FIG. 10 is a side elevational view of the device shown in FIG. 8 rotated 90°;

FIG. 11 is an elevational view in partial section of the embodiment of FIG. 7 shown in applied position to a pair of apertured panels and prior to expansion;

FIG. 12 is an elevational view in partial section of the embodiment shown in FIG. 11 in final expanded and locked position;

FIG. 13 is an end view of the embodiment shown in FIG. 12 taken along line 13—13 of FIG. 12;

FIG. 14 is a perspective view of a further embodiment of the present invention in the form of a screw grommet;

FIG. 15 is a bottom end view in partial section of the grommet shown in FIG. 14 and in installed position; and FIG. 16 is an elevational view of another embodiment of the present invention for use in blind bore applications.

DETAILED DESCRIPTION

Referring now to the drawing, a fastener 20 embodying the teachings of the present invention may take the form of a rivet of the type shown in FIG. 1. Such a rivet 20 includes a head 22, a shank 24 and an expander means 26, which in the disclosed embodiment is in the form of a cylindrical drive pin. It will be recognized by those skilled in the art that such a drive pin can be integrally attached by a frangible connection, or can be loose or be in the form of a screw threaded or any other type of elongated member.

The head 22 is shown as a circular flat head, but it will be appreciated that other variations, such as conical head forms, heads carrying attaching means for secondary articles such as wire clips, molding clips, etc., which are known in the art, are contemplated as being capable of attachment to the basic head 22.

The shank 24, in the illustrated embodiment, includes an axially disposed transverse bifurcation 28 which generally extends from the head to the free extremity of the shank. In the present embodiment this provides two shank portions or prongs 30 which are substantial mirror images of one another and separated by the slot or bifurcation 28. It will be appreciated that while the disclosed embodiment shows two prongs that a multiplicity of prongs greater in number could be utilized for larger sized rivets. A bore 32 traverses the entire shank 24 and the head 22 with the bore having a cylindrical portion 34 adjacent and traversing the head section and a tapered configuration 36, which may be frusto-conical, within a substantial extent of the shank portion. Each prong 30 further includes an axially disposed radial relief means which in this embodiment takes the form of a radially disposed slot 38 having generally parallel side walls and communicating with the frusto-conical bore 36. This provides a plurality of spaced edges 40 in each of the prongs which lie on an imaginary frusto-conical surface defined by bore 36. These edges 40 will be contacted by the drive pin 26 as it is axially projected through the bore. As can be best seen in FIG. 4, the shank 24 may initially have a generally oval configuration with the slot or bifurcation 28 falling on the minor axis of the oval while the slots 38 have their center line falling in a plane substantially perpendicular to the other plane and lying on the major axis of the oval.

When the rivet is telescoped into the pair of panels 44 and 46 having a co-axial aperture 48 passing therethrough, the head 22 is brought to bear against plate 46 with the shank 24 projecting outwardly beyond plate 44. When an axial force is applied to the pin 26 in the direction of the arrow "A", as shown in FIG. 3, the pin is moved through the cylindrical portion 34 of the bore and thence into the tapered portion 36 while being in contact with the edges 40 created by the slot 38. As can be best seen in FIGS. 5 and 6, the prongs 30 are moved radially outwardly and simultaneously the slot 38 is opened up or expanded so that the side portions 50 of each prong 30 are moved circumferentially or laterally outwardly to additionally overlie the panel. This changes the configuration of the shank 24 from an oval configuration to approximately a circular configuration beyond the backside of panel 44 with portions of the prongs adjacent slot 28 intimately engaging the edge of the panel aperture as at points 52. It will be appreciated by those skilled in the art, that actually a crushing of the prong can take place at these points depending on the choice of material from which the fastener is fabricated as well as by the force exerted by the size of the expander means 26 in relation to the size of slots 38.

Additionally, the degree of taper and crushability of said edges 40 can be controlled in relationship to the volumetric space between the minor dimension of the shank and the circular aperture with which it is to be associated. It will be recognized that the fabricator can then control the driving force of the expander means to insure engagement with the aperture wall by the corners of each shank section adjacent the bifurcation. These factors are dependent, as will be appreciated, upon the choice of materials as mentioned hereinabove. It will also be appreciated that the expander means 26 can be fabricated integrally with the fastener by a flangible section 54 which is readily broken upon application of an axial force as indicated by the arrow A in FIG. 3.

A second embodiment of the present invention can be found by referring to FIGS. 7 through 12, wherein similar parts are designated by similar numerals with the addition of the suffix "a". This second fastener 20a includes a head 22a; a shank 24a and an expander means or drive pin 26a. In this embodiment the slot 38a maintains a constant radial depth for a substantial portion of the length of the shank 24a and thence tapers inwardly as designated by the numeral 60, to the free end of the shank. Intermediate the extremities of the tapered portion 60 of slot 38a there are provided a pair of laterally opening ports 62 which communicate with the tapered portion of the slot 60 and the outer circumferential surface of the shank portions 24. Further, in this embodiment, the slot 38a extends all the way up through the head 22a in order to accept at least one laterally extending lug 64, integral with and extending laterally from the expander means 26a. In the present embodiment there are two lugs 64 extending outwardly from opposite sides of the expander means 26a. As can be seen in FIGS. 11 and 12, the fastener 20a is accepted within a pair of panels 46a and 44a by telescoping through a complimentary aperture 48a. When the expander means 26a is axially driven by suitable means, the lugs 64 will ride readily within the slots 38a with the expander means 26a riding within the tapered bore 36a, similar to the other embodiment, until the lugs 64 contact the tapered portion 60 of the slot whence they add to the expansion of the prongs 30a. When the lugs reach the ports 62 they will be thereby trapped against axial movement in either direction. It being understood, of course, that the axial distance between the upper free extremity of the expander means 26a and the lugs 64, as viewed in the drawing, approximates the distance between the upper surface of head 22a and the ports 62, thereby permitting the expander means 26a to be totally housed within the bore 36a. This device, like the first embodiment, expands not only radially but circumferentially as well due to the contact of the expander means 26a with the edges 40a formed by the intersection of the tapered bore with the slots 38a. Thus, a fastener is provided which will aggressively engage the walls of the aperture 48 both by radial expansion as well as by circumferential opening up of the slot 38a and the impingement of edges 52a of each prong section 30a as it buckles about point 51a.

The teachings of the present invention can also be applied to other plastic fasteners, for example in FIGS. 14 and 15 the concepts utilized in the original two embodiments directed to plastic rivets can be used with screw grommets. In this further embodiment the normal screw grommet includes a head 90, a pair of substantially rectilinear prong sections 92 depending from the head 90 and acceptable within a complimentary noncircular apertured panel 94. Such screw grommets normally also have the outer surface of the prongs 92 tapering outwardly from the head and thence inwardly from an intermediate portion, as defined by the numeral 96, to the free end of the prongs 92. This intermediate portion or shoulder 96 provides for temporary engagement of the fastener in a noncircular aperture. There also is provided a slot 98 which intersects a tapered bore 100, as in the other embodiments, so that when a screw 102 is inserted within the through bore 100 it will radially and circumferentially expand each prong section 92 to a position, generally over-emphasized, as seen in FIG. 15. This insures engagement of the grommet not only along one straight edge of the aperture 104 by the surface carrying shoulder 96, but also expands the edges of the prongs 92, designated by the numeral 106, to engage and overlie the adjacent edges of the aperture 104 much in the same fashion as the portions 52 overlay the aperture 48 in the first embodiment.

In each of the first two embodiments the shank has been generally oval in configuration and provided with a substantially smooth exterior on the prongs 30 for engagement when expanded with the edges of the aperture 48. It will be appreciated that such a device could work equally well in a blind bore environment, such as with chip board or flake board of the type used in the manufacture of furniture. In such instances it is desirable to provide shoulder means, and to this end the embodiment of FIG. 16 is substantially identical to the embodiment shown in FIGS. 1 through 6, but is provided with one form of barbed shoulder means 110 to engage or bite into the walls of a blind bore application, not shown.

Devices contemplated in the present invention can be manufactured by standard injection molding techniques and because of the design of the fastener it is contemplated that the fastener could be economically fabricated on a bank-type mold for all of the embodiments. Other embodiments utilizing the teachings of the present invention will be apparent to those skilled in the art.

I claim:

1. A plastic fastener having a head and an integral bifurcated shank forming at least two shank portions, an axial bore traversing said head and extending throughout said shank, said bore being substantially cylindrical adjacent said head and adapted to accept a complimentary axially moveable drive means, said bore being tapered and defined within said shank by tapered facing surfaces on said shank portions and having its major diameter terminating at said cylindrical bore adjacent said head, each shank portion including an axially disposed radial relief means that extends throughout substantially all of the axial extent of each of said shank portions, said relief means on each shank portion includes a compound surface defined by a slot disposed substantially perpendicular to said bifurcation, each of said slots opening into said bifurcation and having a substantially uniform radial depth throughout a substantial portion of its axial extent to form a weakened wall section in each of said shank portions, said slots and said tapered bore at their intersection forming opposed tapered edges which progressively decreases in their radial position toward the free end of said shank, said radial relief means on each said shank portion forming a thinned buckle section between two substantially equal sections of each said shank portions, whereby the axial movement of said drive means will progressively engage the decreasing diameter of the edges formed by the intersection of said frusto-conically defined bore and said slots, and thereby cause said equal sections of each said shank portion to hinge about said buckle section to radially and circumferentially expand said shank portions.

2. A device of the type claimed in claim 1 wherein the external surface of the shank is substantially oval with the major dimension of said shank lying in a plane positioned on the center line of the relief means of two shank portions and the axis of the fastener with the minor dimension falling in a plane normal thereto and passing through the axis, whereby when said oval rivet is utilized with a round aperture, the driving of the axially moveable means results in an expansion of the relief means and substantially full engagement with the circular wall of the aperture.

3. A device of the type claimed in claim 1 wherein said drive means is a pin that is integral with and connected by a frangible section to the head of the fastener.

4. A device of the type claimed in claim 1 wherein said tapered bore is frusto-conical and the slot in each portion of the shank terminates in a tapered edge at the junction of the slot with the tapered bore, said edge being engageable by the drive means, the taper and crushability of said edge being controlled in relationship to the volumetric space between the minor dimension of the shank and the circular aperture with which it is associated to thereby regulate the driving force of the expander means when driven, thereby resulting in engagement of the corners of each shank section adjacent the bifurcation relative to the aperture wall.

5. A device of the type claimed in claim 4 wherein the depth of each slot in the respective shank portions is predetermined to permit controlled lateral flexing of each shank portion when the pin is driven.

6. A device of the type claimed in claim 1 wherein the shank includes a plurality of annular teeth axially spaced along its external extremity for engagement in a blind bore hole.

7. A device of the type claimed in claim 1 wherein said drive means is a drive pin which includes at least one laterally extending lug projecting outwardly therefrom and acceptable for axial movement within one of said shank portion slots, recess means communicating with said one slot adjacent to but spaced from the free end of said shank, said recess means adapted to accept said at least one lug in positive locking relationship when said pin is driven axially in said bore to expand said shank portions.

8. A device of the type claimed in claim 7 wherein said slot being tapered radially inwardly from its uniform radial depth from a point spaced from said head to a point adjacent the free end of said shank, said recess communicating with the tapered portion of said slot.

9. A device of the type claimed in claim 8 wherein said recess also communicates with the outside peripheral surface of said shank.

10. A device of the type claimed in claim 7 wherein there are two of said lugs extending outwardly in opposite directions from said drive pin.

11. A device of the type claimed in claim 8 wherein there are two of said lugs extending outwardly a predetermined diametral extent in opposite directions from said drive pin, the diametral extent of said tapered portion of said slots at the point where said recesses communicate with said slots being less than said predetermined diametral extent thereby forming shoulder means for lockingly engaging said lugs when they fall in said recesses after axial driving of said pin into the bore.

12. A device of the type claimed in claim 1 wherein said drive means is a screw.

* * * * *